B. V. & S. HENRY.
COTTON CHOPPER.
APPLICATION FILED JUNE 22, 1908.
908,096.
Patented Dec. 29, 1908.
2 SHEETS—SHEET 1.
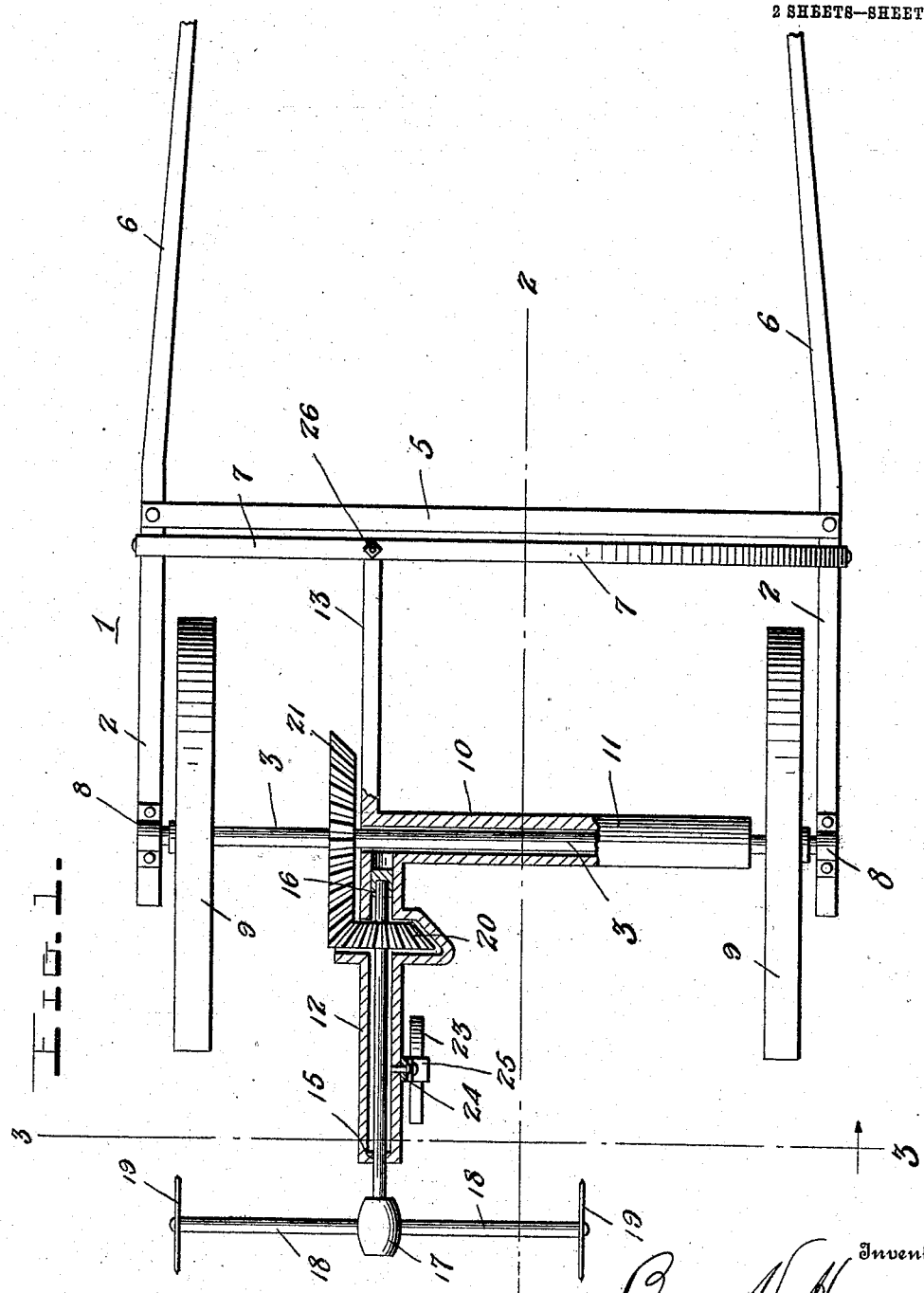
Witnesses
Chas. L. Griesbauer.
M. L. Skinner
Inventors
Byron V. Henry
Smith Henry
By Watson E. Coleman
Attorney

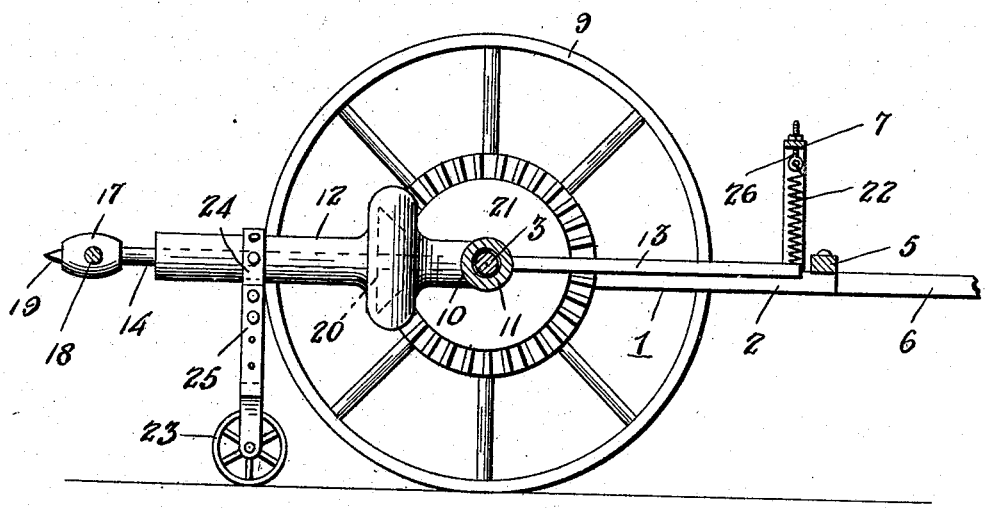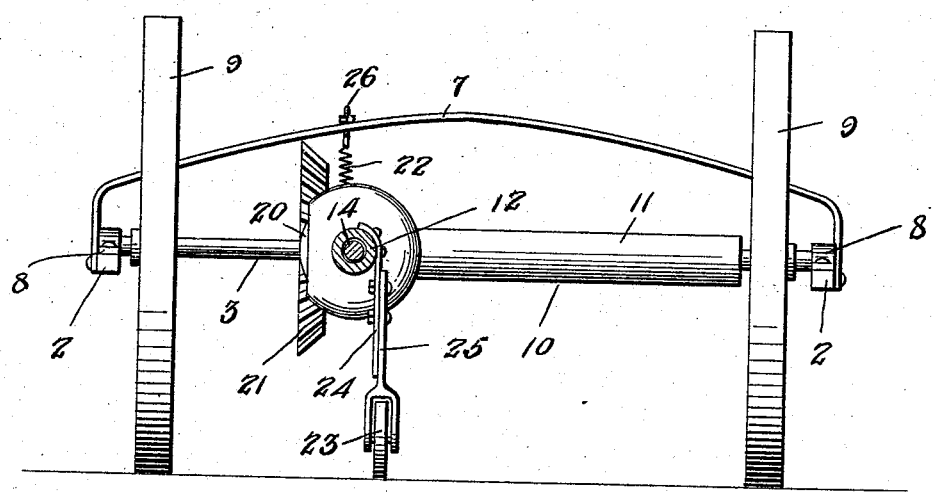

UNITED STATES PATENT OFFICE.

BYRON V. HENRY AND SMITH HENRY, OF LILESVILLE, NORTH CAROLINA.

COTTON-CHOPPER.

No. 908,096.     Specification of Letters Patent.     Patented Dec. 29, 1908.

Application filed June 22, 1908. Serial No. 439,845.

*To all whom it may concern:*

Be it known that we, BYRON V. HENRY and SMITH HENRY, citizens of the United States, residing at Lilesville, in the county of Anson and State of North Carolina, have invented certain new and useful Improvements in Cotton-Choppers, of which the following is a specification, reference being had to the accompanying drawings.

This invention relates to improvements in cotton choppers and it consists of the novel features of construction and the combination and arrangement of parts hereinafter fully described and claimed.

The object of the invention is to improve and simplify the construction and operation of machines of this character and thereby render them less expensive and more durable and effective.

The above and other objects of the invention, as will hereinafter more fully appear, are attained in its preferred embodiment illustrated in the accompanying drawings, in which—

Figure 1 is a top plan view partly in horizontal section of the improved cotton chopper; Fig. 2 is vertical longitudinal section taken on the plane indicated by the line 2—2 in Fig. 1; and Fig. 3 is a vertical transverse section taken on the plane indicated by the line 3—3 in Fig. 1.

In the drawings 1 denotes the main frame which consists of two side bars 2 united by a transverse axle 3 and a forward cross bar 5 and which constitute the extended rear ends of a pair of shafts 6 between which latter the draft animal is arranged and hitched to a suitable draft connection on the forward cross bar 5. The said bars 2 are further connected by a longitudinally curved or offset brace bar 7 which extends upwardly and is provided for a purpose presently explained. The shaft or axle 3 has its ends rotatively mounted in bearings 8 upon the bars 2 and fixed to it for rotation therewith are two ground wheels 9 which serve to support the frame.

Mounted upon the intermediate portion of the shaft or axle 3 is a swinging frame 10 consisting of a transverse tubular member 11, a rearwardly extending tubular member 12 and a forwardly extending member or arm 13. Said swinging frame 10 is substantially T-shaped in form and has its transverse member 11 arranged upon the shaft 3 for rotary or oscillatory movement. The rearwardly extending member or arm 12 has arranged within it a longitudinal shaft 14 rotatively mounted in bearings 15, 16 in said member and having its end projecting out of the former and carrying a hub 17 provided with radiating arms 18. Suitable cotton chopping blades or hoes 19 are secured upon the outer ends of the arms 18 and preferably two of the latter are provided and arranged at diametrically opposite points upon the hub or wheel 17 as illustrated. Fixed to the shaft 14 and arranged in an enlarged portion of the arm or member 12 of the swinging frame is a beveled pinion 20 which meshes with a beveled gear 21 fixed upon the shaft or axle 3 close to said swinging frame 10.

In order to control the depth of the cut made by the hoes or choppers 19, I provide a spring 22 for actuating the rear end of the shaft 14 downwardly and an adjustable gage wheel or roller 23 for limiting the downward movement of said end of the shaft and consequently the depth of the cut made by the hoes. Said gage wheel is journaled in a longitudinal adjustable bracket arm or hanger 24 connected to the member 12 of the swinging frame and depending therefrom. While any suitable means may be provided for adjusting the gage wheel 23, the arm 24 is preferably made to slidably engage sections which are adjustably connected by one or more clamping bolts 25. The spring 22 has its lower end attached to the forwardly projecting arm 13 on the swinging frame 10 and its upper end is adjustably connected by a screw eye 26 to the curved brace 7 as shown more clearly in Fig. 2 of the drawings.

In operation it will be seen that when the machine is drawn forwardly by a draft animal the motion of the wheels 9 and the axle 3 will be imparted by beveled gears 20, 21 to the shaft 14 of the hoe or chopper wheel which latter will be rotated to chop the cotton. The spring 22 serves to press the chopper wheel downwardly and the gage wheel 23 maintains the axis of said wheel the same distance from the surface of the ground without regard to the evenness of the latter so that the hoes 9 will be caused to cut at a uniform depth. This depth may be readily varied by adjusting the hanger 25 of said gage wheel. It will be noted that the hoe or chopper shaft 14 is disposed to one side of the center of the machine to move over the row of cotton to be chopped so that the draft animal and gage wheel go between the rows.

Having thus described the invention what is claimed is:

1. A cotton chopper comprising a main frame, a rotatable axle carried by the rear portion of said main frame, supporting and drive wheels upon said axle, a vertically disposed arch upon the front portion of the main frame, a swinging frame mounted upon the axle and having forwardly and rearwardly projecting arms, a rotary chopping blade carried by the rear arm of the swinging frame and driven from said axle, a coil spring between the front arm of the swinging frame and said arch for actuating said rear arm and chopping blade downwardly, and a gage wheel carried by said rear arm of the swinging frame for limiting its downward movement under the action of said spring.

2. The herein described cotton chopper comprising a main frame having a connecting bar and two side bars united by the former intermediate their ends and having their front ends extended to form a pair of shafts, bearings upon the rear ends of said side bars, an axle rotatable in said bearings, supporting and drive wheels fixed to said axle, a swinging frame mounted upon the axle and having the tubular member 11 to receive the axle, the forwardly projecting arm 13 and the rearwardly projecting tubular arm 12, a longitudinal shaft journaled in said tubular arm, a chopping wheel fixed to the rear end of said longitudinal shaft and having arms carrying cutting blades, a beveled gear fixed to said longitudinal shaft, a beveled gear fixed to the axle and in mesh with the first mentioned gear, a vertically disposed arch uniting the side bars and disposed adjacent to said connecting bar, a coil spring fixed at its lower end to the front arm of the swinging frame and having its upper end connected to said arch whereby the tubular rear arm of the swinging frame will be actuated downwardly, a hanger member fixed at its upper end to the rear arm of the swinging frame and formed with a series of openings, a co-acting hanger member having its upper portion formed with a series of openings and its lower end carrying a gage wheel, and bolts passed through said openings in the two hanger members to adjustably secure them together.

In testimony whereof we hereunto affix our signatures in the presence of two witnesses.

BYRON V. HENRY
SMITH HENRY.

Witnesses:
  M. P. WALL,
  B. R. WALL.